United States Patent [19]
Rumreich et al.

[11] Patent Number: 6,088,064
[45] Date of Patent: *Jul. 11, 2000

[54] METHOD AND APPARATUS FOR POSITIONING AUXILIARY INFORMATION PROXIMATE AN AUXILIARY IMAGE IN A MULTI-IMAGE DISPLAY

[75] Inventors: Mark Francis Rumreich; Mark Robert Zukas, both of Indianapolis, Ind.

[73] Assignee: Thomson Licensing S.A.

[*] Notice: This patent issued on a continued prosecution application filed under 37 CFR 1.53(d), and is subject to the twenty year patent term provisions of 35 U.S.C. 154(a)(2).

[21] Appl. No.: 08/770,770

[22] Filed: Dec. 19, 1996

[51] Int. Cl.[7] .............................. H04N 7/00; H04N 11/00; H04N 5/445

[52] U.S. Cl. .............................. 348/564; 348/468

[58] Field of Search .............................. 348/468, 564, 348/1–12, 565, 563, 589; H04N 7/00, 11/00, 5/445

[56] References Cited

U.S. PATENT DOCUMENTS 5,537,151  7/1996  Orr et al. .............................. 348/468
5,671,019  9/1997  Isoe et al. .............................. 348/468

FOREIGN PATENT DOCUMENTS

| 0301488 | 2/1989 | European Pat. Off. | H04N 5/44 |
| 0401930 | 12/1990 | European Pat. Off. | H04N 5/76 |
| 0660602 | 6/1995 | European Pat. Off. | H04N 5/445 |
| 0762751 | 3/1997 | European Pat. Off. | H04N 5/445 |
| 7-236100 | 9/1995 | Japan | H04N 5/45 |
| 2232033 | 11/1990 | United Kingdom | H04N 5/45 |

*Primary Examiner*—Howard Britton
*Assistant Examiner*—Nhon T Diep
*Attorney, Agent, or Firm*—Joseph S. Tripoli; Robert D. Shedd; David T. Shoneman

[57] ABSTRACT

Method and apparatus for generating a signal representing a multi-image video display including a main image and an auxiliary image, e.g., a picture-in-picture (PIP) image, provides for positioning auxiliary information, such as closed caption text, proximate the auxiliary image. The auxiliary information is located within a border region for the auxiliary image and positioned for indicating to a user that the auxiliary information is associated with the auxiliary image. The region containing the auxiliary information moves in response to movement of the auxiliary image such that the auxiliary information remains proximate the auxiliary image.

13 Claims, 4 Drawing Sheets

METHOD AND APPARATUS FOR POSITIONING AUXILIARY INFORMATION PROXIMATE AN AUXILIARY IMAGE IN A MULTI-IMAGE DISPLAY

CROSS-REFERENCE TO RELATED APPLICATIONS

This application is related to the following commonly-assigned U.S. patent applications: Ser. No. 08/769,329 entitled "TELEVISION APPARATUS FOR SIMULTANEOUS DECODING OF AUXILIARY DATA INCLUDED IN MULTIPLE TELEVISION SIGNALS", Ser. No. 08/769,333 entitled "VIDEO SIGNAL PROCESSING SYSTEM PROVIDING INDEPENDENT IMAGE MODIFICATION IN A MULTI_IMAGE DISPLAY", Ser. No. 08/769,331 entitled "METHOD AND APPARATUS FOR PROVIDING A MODULATED SCROLL RATE FOR TEXT DISPLAY", and Ser. No. 08/769,332 entitled "METHOD AND APPARATUS FOR REFORMATTING AUXILIARY INFORMATION INCLUDED IN A TELEVISION SIGNAL", all of which were filed in the name of Mark F. Rumreich et al. on the same date as the present application.

FIELD OF THE INVENTION

The invention relates to television receivers capable of generating a multi-image display having main and auxiliary images such as picture-in-picture (PIP) or picture-outside-picture (POP) displays. More particularly, the invention relates to a method and apparatus for displaying auxiliary information, such as closed caption information, proximate an auxiliary image in a multi-image display.

BACKGROUND

A television signal may include auxiliary information in addition to video program and audio program information. For example, an NTSC (National Television Standards Committee) television signal may include two bytes of closed captioning data during the latter half of each occurrence of line 21 of field 1. Closed caption data may be decoded and displayed to provide a visible text representation of a television program's audio content. Additional closed caption data and other types of similarly encoded auxiliary information, such as extended data services information (XDS), may be included in other line intervals such as line 21 of field 2. United States law requires caption decoders in all television receivers having displays larger than 13 inches and most television programming (including video tapes) now includes captioning data.

Although captioning was developed to aid the hearing impaired, captioning can also provide a benefit to non-hearing impaired viewers as well. Captioning for a multi-image display such as picture-in-picture (PIP) or picture-outside-picture (POP) displays is an example of this type of additional benefit. For example, activating a PIP feature produces an auxiliary image representing the video content of a secondary television program signal. The auxiliary image is a small picture that is inset into a portion of the main picture. However, only the audio program associated with the main picture is processed and coupled to the speakers of the television. The audio content of the secondary signal is lost. Because the audio program is important to the comprehension of a television program, the usefulness of a multi-image display feature such as a PIP display is severely limited by the lack of an associated audio program. An approach to solving this problem is to display captions, i.e., visible text, representing the PIP audio program in a portion of the display. However, the closed caption decoder in most television receivers processes only the caption information associated with the "main" picture, not the small picture signal.

An exception to this general rule can be found in certain television receivers manufactured by Sharp Corporation such as models 31H-X1200 and 35H-X1200. These Sharp television receivers display captions representing the audio of the PIP image by providing a switching capability that permits coupling the PIP signal to the main caption decoder. PIP captions are displayed full size (up to four rows of 32 large characters) at the top or bottom of the screen (a user selectable position). An example of PIP captioning produced by Sharp television receivers is shown in FIG. 1 which depicts a display including main image 100, PIP image 102 and PIP caption 104.

SUMMARY OF THE INVENTION

The invention resides, in part, in the inventors' recognition of a number of problems associated with the described PIP captioning implementation. First, main-picture captioning and small-picture captioning cannot be displayed simultaneously. Second, the small image combined with the caption display for the small image may obscure the main image to an extent that is objectionable to a user. For example, a PIP caption as in the Sharp implementation (up to 20% of the screen area) combined with a normal size PIP image (one-ninth of the screen area) may obscure more than 30% of the main video display. Third, the small-picture caption is difficult to follow simultaneously with small-picture video because the location of the caption at the top or bottom of the screen is physically disconnected from the small picture and may be a significant distance from the small picture. Fourth, the appearance of small-picture captions is virtually identical to main-picture captions causing users to become confused as to which image is associated with the caption. The combination of these problems may make auxiliary-picture captioning that is implemented in the manner described above objectionable to an extent that renders auxiliary-picture captioning useless for many viewers.

The invention also resides, in part, in providing apparatus and a method for solving the described problems associated with the prior art. More specifically, the present invention provides for positioning auxiliary information, such as closed captioning text characters, that is associated with an auxiliary picture in a multi-image display proximate the auxiliary picture. One aspect of the invention involves combining signals representing an auxiliary image, a border region for the auxiliary image, and auxiliary information with a signal representing the main image to produce a combined signal representing a composite image having the auxiliary information within the border region and proximate the auxiliary image. Another aspect of the invention involves producing a signal representing an image having first, second and third regions representing a main image, an auxiliary image and auxiliary information, respectively, and producing a change in the location of the second region such that the third region changes location in response to the change in location of the second region. Another aspect of the invention involves positioning the third region within the image for indicating to a user that the auxiliary information is associated with an auxiliary video program included in the second region. Another aspect of the invention involves a method of generating a multi-image display by combining main and auxiliary image signals with border and auxiliary information such that the auxiliary information is included within a border region and proximate the auxiliary image.

BRIEF DESCRIPTION OF THE DRAWING

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
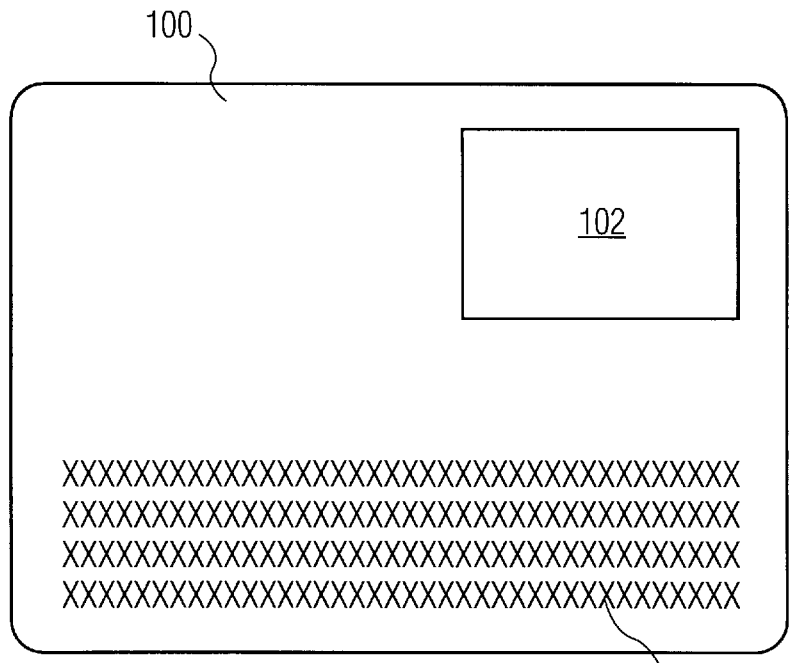
FIG. 1 depicts a PIP captioning orientation as implemented in the prior art.

For ease of description, the exemplary embodiments depicted in the drawing will be described in the context of a picture-in-picture (PIP) display system having a small auxiliary picture inset into a large main picture. However, the principles of the invention are applicable to other multi-image display systems such as a picture-outside-picture (POP) system in which an auxiliary picture located is located outside of ,e.g., beside, the main picture.

Figure 2:
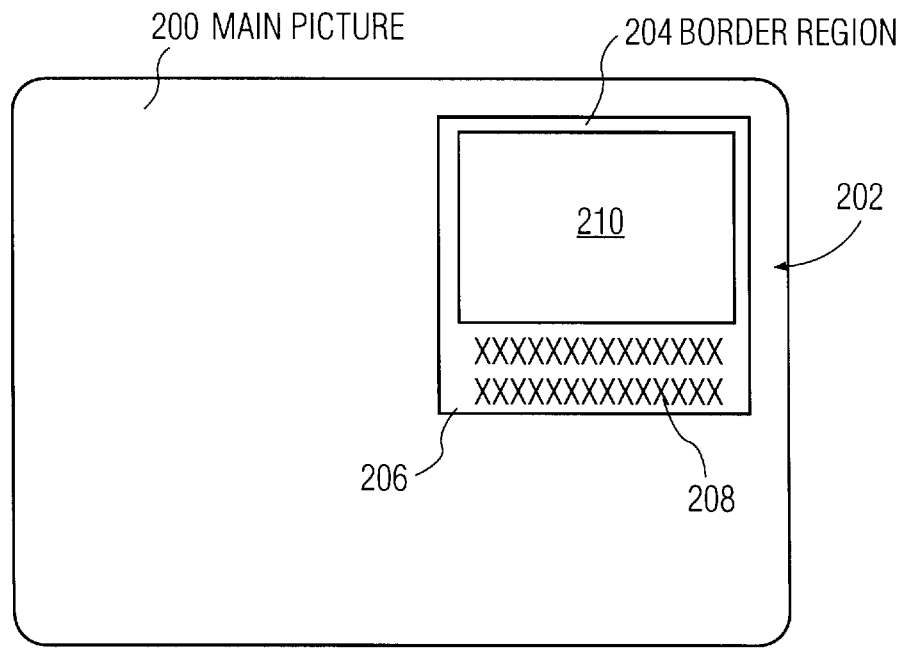
FIG. 2 depicts an orientation of auxiliary information relative to an auxiliary picture and a main picture in accordance with the present invention.

FIG. 2 depicts the image orientation of a PIP image 202 in relation to a main picture 200 as produced by a PIP captioning image generation system of the present invention. The position of the PIP image 202 within the confines of the main picture 200 is conventionally defined by a viewer. Specifically, the viewer, through a remote control, defines a vertical line number (vertical position) and a pixel location (horizontal position) where one corner (e.g., upper left corner) of the PIP image is to be located. The active region 210 of the PIP image 202, where the PIP video is displayed, has a typical dimension of one third by one third of the size of the main picture 200. The PIP image area 210 (active region) is circumscribed by a border region 204. This border region is approximately 0.25 inches (0.64 cm) wide. In the normal operating mode, e.g., without closed captioning, the border of the PIP image is approximately 0.25 inches wide on all sides of the active image area 210. Upon activation of the closed captioning for the PIP image, the bottom border area 206 is extended to a height of approximately 2 inches (5 cm). The closed caption information is displayed in this 2 inch wide region (referred to as a closed caption window) as two-lines of closed caption text 208. The invention provides a method and apparatus for producing this extended border area 206 and positioning the closed caption information 208 within the extended border area 206 (i.e., position the caption for the PIP image proximate to the PIP active image area 210).

Although the depicted embodiment of the display positions the closed caption information for the PIP image at the bottom of the PIP image area, the PIP closed caption information could as easily be placed in an extended border area at the top of the PIP image area or anywhere else that is proximate the PIP image area 210.

Figure 3:
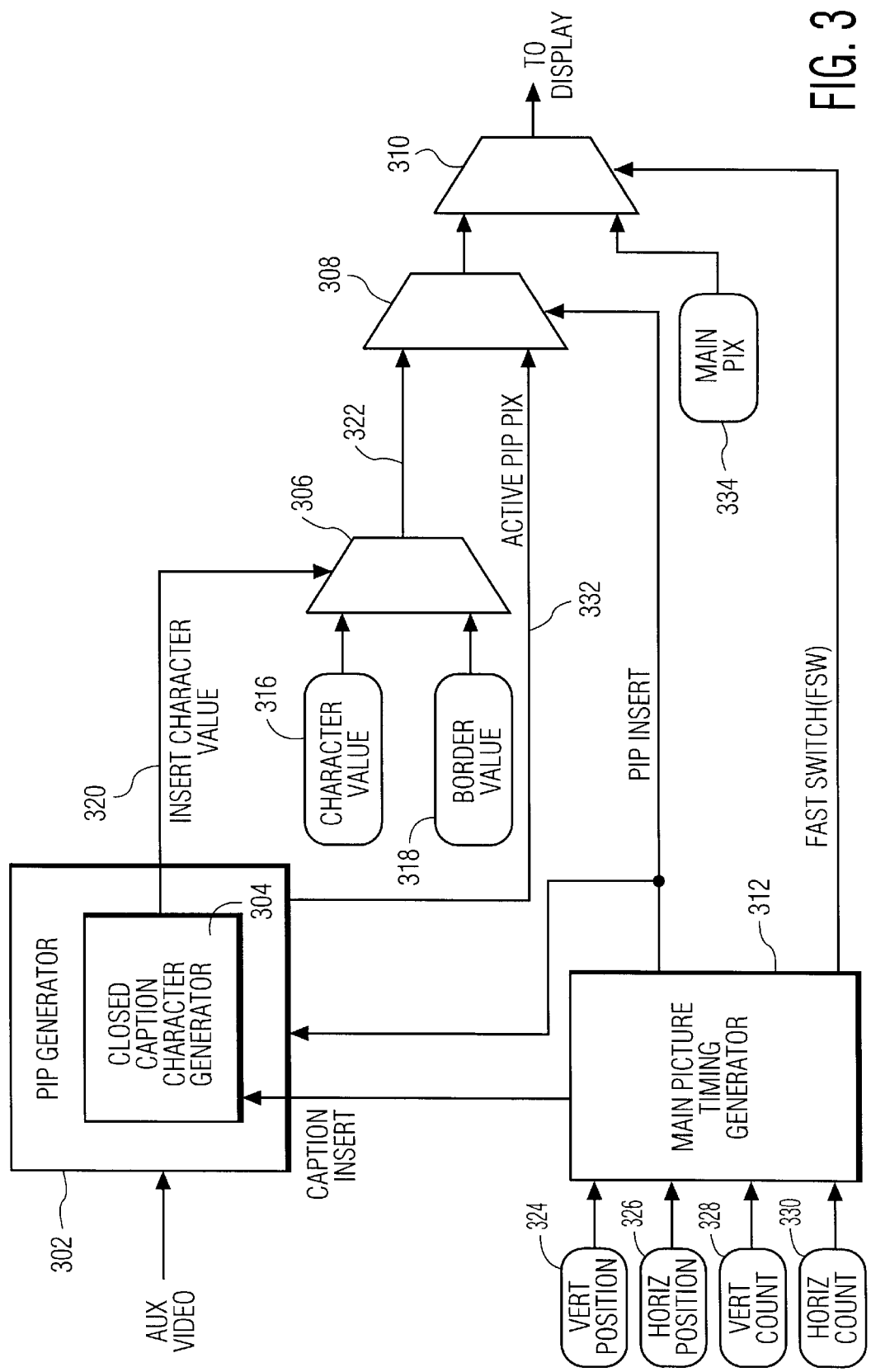
FIG. 3 depicts circuitry for generating an exemplary small-picture caption in accordance with the present invention.
Figure 4A:
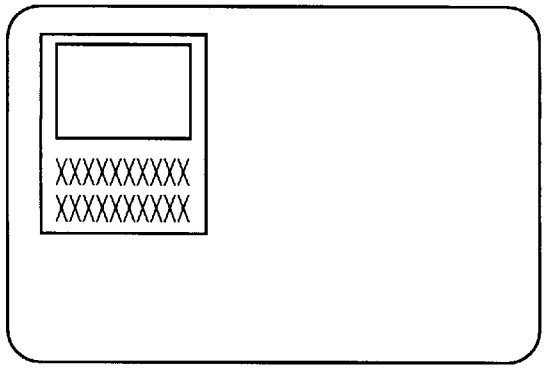
FIGS. 4 and 5 illustrate various orientations of small-picture captioning with respect to a small image and to the main image.
Figure 4B:
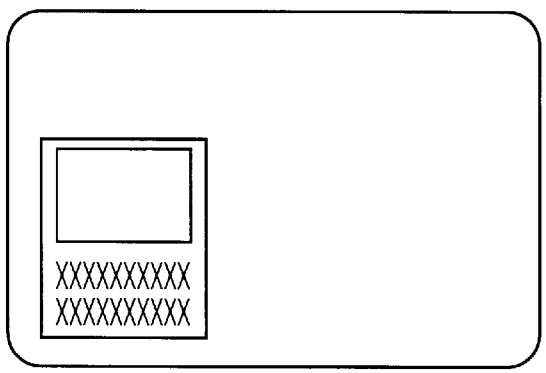
Figure 4C:
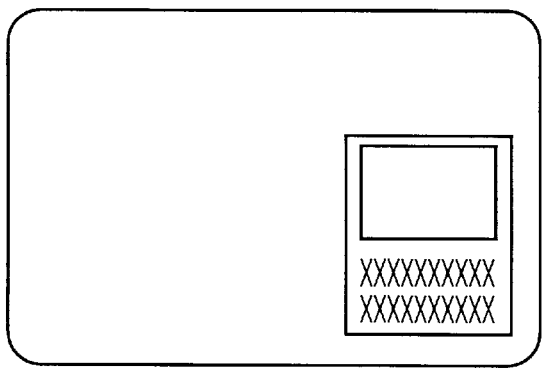
Figure 4D:
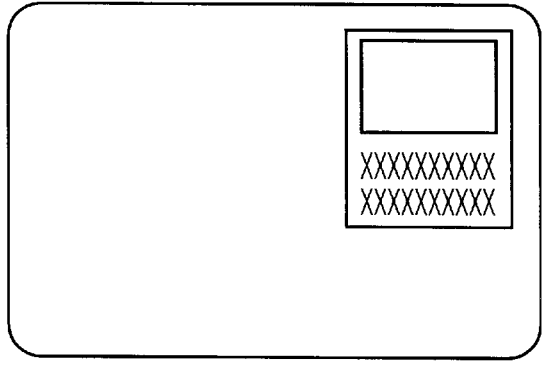

FIG. 3 depicts circuitry 300 for positioning the PIP closed caption information proximate the active PIP image region as depicted in FIG. 2. The circuitry contains a main picture timing generator 312 coupled to a multiplexer array 314 and a PIP image generator 302. The multiplexer array contains three multiplexers 306, 308 and 310. These multiplexers are actively switched, on a pixel-by-pixel basis, to combine pixel values (e.g., luminance and color difference signals) and produce th images depicted in FIG. 2. Specifically, the third multiplexer 310 inserts the PIP image border and caption into the main picture; the second multiplexer 308 inserts the active PIP video imagery into the border region; and the first multiplexer combines closed caption character values with border values that forms a PIP captioning window.

More specifically, the timing generator 312 has as its input a vertical position 324 and a horizontal position 326 that is user defined for locating the PIP image within the boundaries of the main picture. For example, a user can determine the location of the PIP image by activating a "MOVE" key on a remote control. In a typical application, each activation of the MOVE key moves the PIP image to a different corner of the main display as indicated by the vertical and horizontal position values. The system shown in FIG. 3 is controlled, for example, by a microcomputer (not shown in FIG. 3). The microcomputer responds to the user-selected PIP image position by generating two digital values representing the horizontal and vertical coordinates of the PIP position. The microcomputer stores the digital values in memory and, in a typical system, communicates the digital values to the system in FIG. 3 via a data bus to provide vertical position 324 and horizontal position 326.

In addition to the horizontal and vertical position inputs, timing generator 312 receives vertical count 328 and horizontal count 330 as input signals. These count values indicate the present main picture line and pixel. The count values are generated in a conventional manner by counters (not shown in FIG. 3) that count in response to timing signals including horizontal and vertical sync. Conventional sync signal generation circuitry (not shown in FIG. 3) produces the sync signals in response to a composite sync component of a television signal.

In response to the count values, the timing generator produces three control signals, namely, CAPTION_INSERT, PIP_INSERT and FSW (FAST SWITCH). In general, these signals are timing signals that are active for certain portions (e.g., a predefined number of pixels) within certain lines. For example, the location for the caption within the main picture is defined by a number of inclusive lines and pixels. As such, for all count values that include these lines and pixels, the CAPTION_INSERT signal is active to define a rectangular caption window. The beginning of the window, e.g., its upper left corner, is defined as an offset of a number of lines and pixels from the vertical and horizontal position values (324 and 326) that define the location of the PIP image. The CAPTION_INSERT signal is coupled to closed caption generator 304 which generates signal INSERT CHARACTER VALUE on path 320 for controlling first multiplexer 306 as described further below.

Similarly, the PIP_INSERT and FSW signals are active for certain pixels and lines to control insertion of the active PIP image into the border region as well as insertion of the PIP image with its border and captioning into the main picture. Signal PIP_INSERT is also coupled to PIP generator 302 for defining where PIP generator 302 should position the PIP image pixels relative to the main picture.

The PIP image generator 302 contains a closed captioned character generator 304 that produces closed caption characters. Closed captioning standard EIA-608 specifies a closed caption character format comprising a display character grid of 15 rows by 32 columns with up to four rows of characters being displayed at any one time. Although these standard characters could be displayed proximate the image area of the PIP image using the present invention, the invention generally uses reformatted characters produced by character generator 302. Reformatting performed by unit 304 comprises translating the standard closed caption character set into a reduced character set, utilizing a smaller font size, and displaying only two rows of 18 characters each within the PIP captioning window, e.g., the two-inch wide border extension. The reformatting facilitates viewer comprehension and minimizes main picture obstruction. One example of a closed captioned character generator that provides reformatted characters is disclosed in U.S. patent application Ser. No. 08/769,332 entitled "METHOD AND APPARATUS FOR REFORMATTING AUXILIARY INFORMATION INCLUDED IN A TELEVISION SIGNAL" which was filed in the name of Mark F. Rumreich et al. on the same date as the present application, is commonly assigned, and is incorporated herein by reference.

The PIP generator 302 produces a control signal INSERT CHARACTER VALUE on path 320 that is coupled to the control terminal of the first multiplexer 306. In addition to the control signal, the PIP generator produces a PIP picture signal (ACTIVE PIP PIX) that is coupled to the second multiplexer 308. Using the PIP generator 302 and its accompanying closed caption character generator, the PIP picture or image as well as the closed-captioned data is extracted in a conventional manner from an auxiliary video signal (AUX VIDEO). Positioning of the PIP image is controlled by the PIP_INSERT signal that is generated by the main picture timing generator 312, e.g., the PIP generator produces the PIP image pixels during a period when the PIP_INSERT signal is active. Furthermore, the timing generator 312 produces a CAPTION INSERT signal that is coupled to the closed-captioned character generator. This signal controls the position of the closed-captioned window with respect to the main picture, e.g., the caption character pixels are positioned at pixels and lines where the CAPTION INSERT signal is active.

The INSERT CHARACTER VALUE control signal (path 320) selects as the output of the first multiplexer either a character value 316 (e.g., a white level pixel value) or a border value 318 (e.g., a gray level pixel value). The result is an array of character values and border values, e.g., white pixels on a gray background, that when taken together as an array of values depict one or more text characters on a gray background. The output of the first multiplexer 306 is coupled via path 322 to the first input of the second multiplexer 308. The output of the first multiplexer is essentially an image (a rectangular border layer) having a constant luminance value across the entire image except in a region where the closed captioned characters are inserted. The characters are located in a caption window defined by the CAPTION INSERT signal.

The second multiplexer 308 combines the active PIP image video with the border layer. As such, the second input of multiplexer 308 is the active PIP image video (ACTIVE PIP PIX 332) produced by the PIP generator 302. The second multiplexer 308 is controlled by the PIP_INSERT signal produced by the timing generator 312. The timing generator 312 produces the PIP_INSERT signal to create the active PIP image area, e.g., a "high" signal during a number of pixels in each line that is to contain the PIP pix. Specifically, the PIP_INSERT signal selects the first input to the second multiplexer for all vertical and horizontal count values outside of the active PIP image area. For all vertical and horizontal count values within that region, the PIP INSERT signal selects the active PIP image video for output from the second multiplexer 308. As such, the active PIP video is inserted into the border layer proximate the PIP captioning window. A similar effect is accomplished if the first and second multiplexers are in reverse order, e.g., the active PIP image is combined with the border and then multiplexed with the character value.

Timing generator 312 includes conventional logic devices comprising, e.g., gates, flip-flops, etc. that generate active states on control signals CAPTION_INSERT, FSW, and PIP_INSERT during time intervals described above. The specific time intervals utilized in the exemplary embodiment are defined by the following relationships between horizontal count 330 (referred to below as "HC"), vertical count 328 ("VC"), horizontal position 326 ("HP"), and vertical position 324 ("VP"). Signal CAPTION_INSERT is active (e.g., high or logic 1) when:

$$4HP<HC<(4HP+220);$$

and $$(VP+75)<VC<(VP+72+18CAP).$$

That is, signal CAPTION_INSERT is active when HC is greater than 4HP and less than 4HP 30 220, and VC is greater than (VP+75) and less than (VP+72+18CAP) where "CAP" is a binary value (either 1 or 0) indicating whether PIP captioning is enabled. That is, when a user enables PIP captioning, e.g., by selecting "PIP CAPTIONING ON" from a setup menu, CAP has a value of 1. Similarly, signal FSW is active when:

$$4HP<HC<(4HP+232);$$

and $$VP<VC<(VP+75+18CAP);$$

Signal PIP_INSERT is active when:

$$4HP<HC<(4HP+22);$$

and $$(VP+3)<VC<(VP+72).$$

Values such as the 4 that is multiplied times HP and the 220 that is added to HP define horizontal offsets (e.g., in pixels) that control the horizontal position and width of the border, PIP image and PIP caption windows. Similarly, values that are added to VP define vertical offsets (e.g., in lines) that control the vertical position and height of the border, PIP image, and PIP caption windows. It will be apparent that these offset values can be modified to vary the position and size of the windows as needed.

Figure 5A:
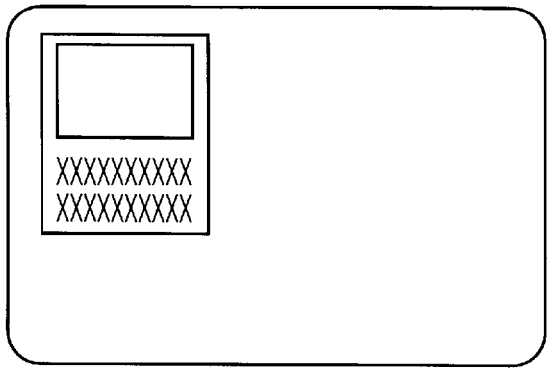
Figure 5B:
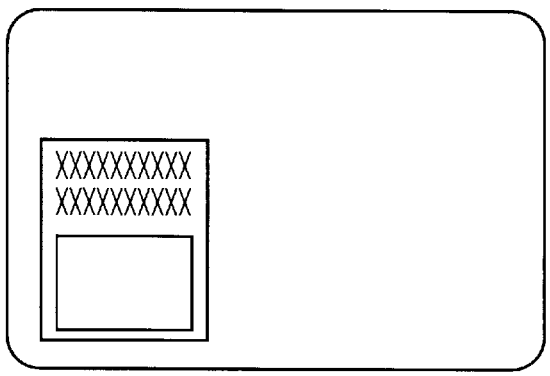
Figure 5C:
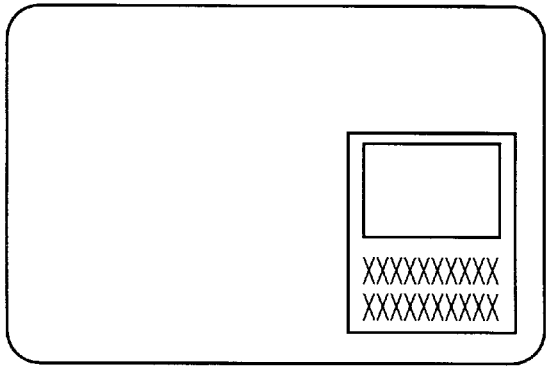
Figure 5D:
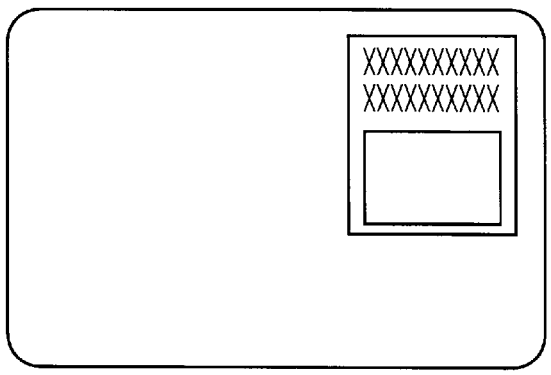

Regardless of the ordering of the first and second multiplexers, the system provides for keeping the PIP captioning in close proximity to the PIP image. If the location of the PIP image changes, for example, when the user moves the PIP image (such as using the abovementioned "MOVE" key on a remote control), the location of the PIP caption moves automatically to remain in close proximity to the PIP image. That is, the location of the PIP captioning is determined in response to the location of the PIP image. FIG. 4 illustrates four exemplary locations of a PIP image and an exemplary orientation of the PIP captioning for each PIP image location. A variation of the arrangement of FIG. 4 is illustrated in FIG. 5 in which PIP captioning automatically changes its orientation with respect to the main image and moves within the border layer. For example, moving the PIP image from a top portion of the main image to a bottom portion of the main image causes the PIP captioning to move within the border as shown in FIGS. 5A and 5B or as shown in FIGS. 5C and 5D. Moving the PIP captioning within the border layer can, for example, improve readability of the PIP captioning and/or minimize interference of the PIP captioning with the main image. The particular manner in which the PIP captioning moves within the border layer can be selected by a user from a setup menu.

Returning to FIG. 3, a third multiplexer 310 selects between the PIP image with its border layer and the main picture 334. The third multiplexer 310 is driven by a fast switch (FSW) signal generated by the timing generator 312. The FSW signal selects the first input to the third multiplexer 310 (the PIP image and border) for all horizontal and vertical count values within the PIP image area including the border region. For all vertical and horizontal count values outside of the image and border region for the PIP image, the FSW signal selects the main picture. As such, the PIP image and its border layer is inserted into the main picture and the FSW signal defines the width of the border. The signals at the output of the multiplexer 310 are coupled to a display driver (not shown but well known in the art).

Using the circuitry of FIG. 3, the display of FIG. 2 is produced. The circuitry, in essence, uses a layered approach to image generation. Specifically, a closed caption text character value is combined with a border value to produce a border layer (a gray layer having a predefined size and containing closed caption text), then the active PIP pix is combined with the border layer, and lastly, the main pix is multiplexed with the PIP image, its border and text to create the comprehensive PIP display of FIG. 2. Because the system provides for locating the closed caption text in close proximity to the PIP image, a viewer can easily comprehend the closed caption text in reference to the PIP image.

Although various embodiments which incorporate the teachings of the present invention have been shown and described in detail herein, those skilled in the art can readily devise many other varied embodiments that still incorporate these teachings. For example, various configurations of the border region shown in FIG. 2 are possible. First, various orientations of the border region are possible as discussed above and shown in FIGS. 4 and 5. In addition, the border region extension containing the auxiliary information can be adjacent to the PIP image as shown in FIGS. 2, 4 and 5 or can be located spaced slightly from the PIP image, e.g., with a region of different color and/or brightness.

What is claimed is:

1. Apparatus comprising:
    means for processing a first television signal representative of an auxiliary image for generating first auxiliary information associated with said auxiliary image; and
    means for processing a second television signal representative of a main image for generating second auxiliary Information associated with said main image;
    means for producing a composite image comprising said main image, said second auxiliary information, said auxiliary image, and said first auxiliary information, said first auxiliary information being displayed external to said auxiliary image and within a border region proximate to said auxiliary image.

2. The apparatus of claim 1 wherein said auxiliary information comprises text.

3. The apparatus of claim 2 wherein said text comprises closed caption information.

4. The apparatus of claim 1 wherein
    said means for producing a composite image comprises a multiplexer; and
    a timing generator for producing a timing signal for causing said multiplexer to include said auxiliary image, said auxiliary information and said border region in said composite image.

5. The apparatus of claim 4 wherein said auxiliary information comprises closed caption information; said multiplexer combines said border region with said closed caption information to produce a border layer, combines said auxiliary image with said border layer to produce an intermediate signal, and combines said intermediate signal with said signal representing said main image to produce a combined signal.

6. The apparatus of claim 5 wherein said multiplexer comprises:
    a first multiplexer for combining said border region with said closed caption information to produce a border layer representing said border region including said closed caption information;
    a second multiplexer, coupled to said first multiplexer, for combining said auxiliary image with said border layer to produce an intermediate signal; and
    a third multiplexer, coupled to said second multiplexer, for combining said intermediate signal with said signal representing said main image.

7. The apparatus of claim 6 wherein said timing generator produces a control signal for said multiplexer in response to a user defined horizontal and vertical coordinate position for said auxiliary image, a vertical count value and a horizontal count value, where the horizontal and vertical count values indicate a particular pixel location being displayed in said main image.

8. The apparatus of claim 7 wherein said auxiliary image comprises one of a PIP image and a POP image.

9. Apparatus comprising:
    means for processing a main video signal and an auxiliary video signal for generating an output signal representing a video image having a first region representing said main video signal, a second region representing said auxiliary video signal, a third region representing auxiliary information extracted from said auxiliary video signal and a border region proximate to said second region, said third region being positioned external to said second region and within said border region; and
    means for producing a change in location of said second region within said video image; said third region and said border region exhibiting corresponding changes in location within said video image in response to said change in location of said second region.

10. The apparatus of claim 9 wherein said second and third regions being located in said video image with a first orientation before said change in location of said second region; said first orientation being maintained following said change in location of said second region.

11. The apparatus of claim 9 wherein said second and third regions being located in said video image with a first orientation before said change in location of said second region; said first orientation changing to a second orientation following said change in location of said second region.

12. A method for producing a multi-image display comprising the steps of:
    processing a first television signal representative of an auxiliary image:
    generating first auxiliary information from said first television signal
    processing a second television signal representative of a main image;

generating second auxiliary information from said second television signal; and combining said main image, second auxiliary information, said auxiliary image, and said first auxiliary information to generate a composite image wherein said first auxiliary information is displayed separable from said auxiliary image.

13. The method of claim 12 wherein said border region further surrounds said auxiliary image.

* * * * *